Sept. 20, 1932.  E. H. LORENZ  1,878,156
APPARATUS FOR HANDLING GLASSWARE
Filed July 11, 1927  7 Sheets-Sheet 1

Inventor
E. H. Lorenz
by Robert D. Brown
Attorney.

Sept. 20, 1932.　　　　E. H. LORENZ　　　　1,878,156
APPARATUS FOR HANDLING GLASSWARE
Filed July 11, 1927　　　7 Sheets-Sheet 2

Inventor
E. H. Lorenz
by Robert D. Brown
Attorney.

Sept. 20, 1932.  E. H. LORENZ  1,878,156
APPARATUS FOR HANDLING GLASSWARE
Filed July 11, 1927   7 Sheets-Sheet 3
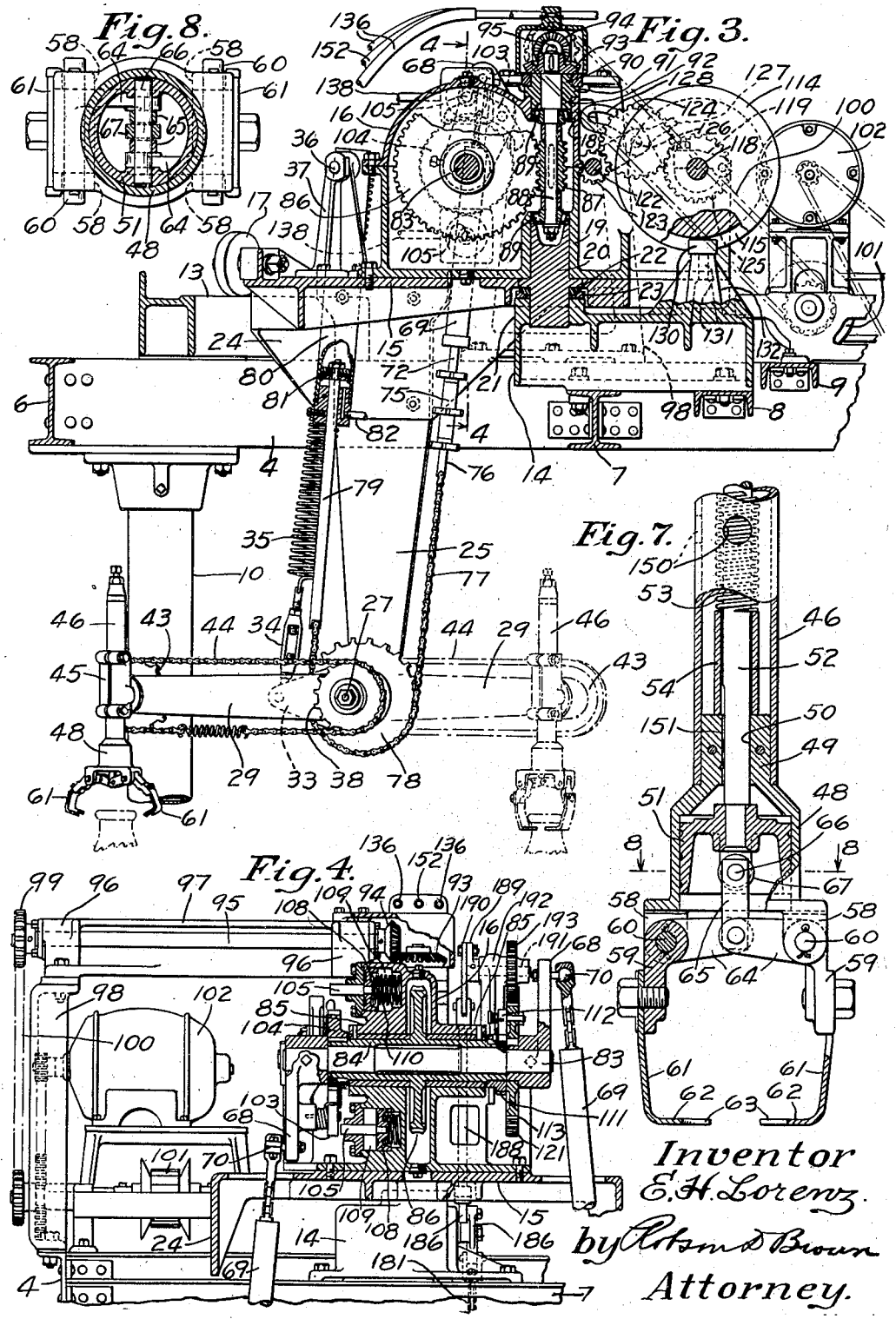
Inventor
E. H. Lorenz.
by Artemas Brown
Attorney.

Sept. 20, 1932.  E. H. LORENZ  1,878,156
APPARATUS FOR HANDLING GLASSWARE
Filed July 11, 1927   7 Sheets-Sheet 4
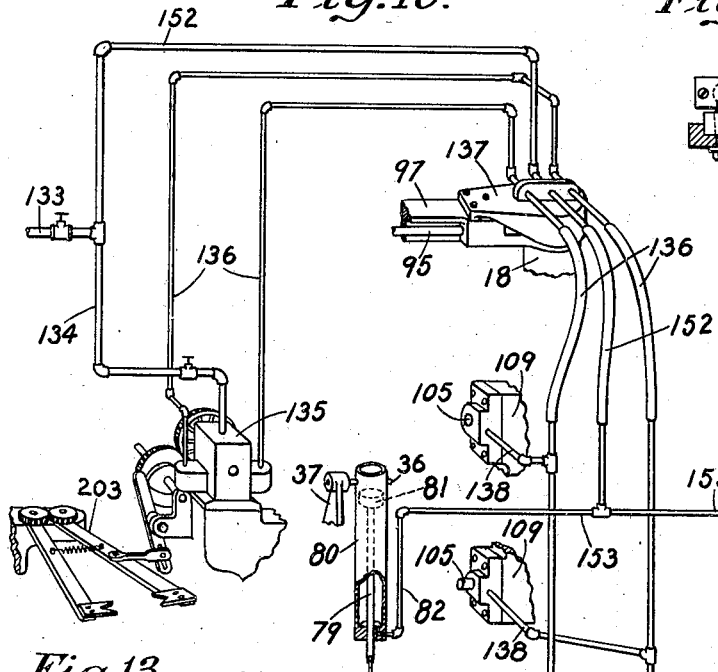
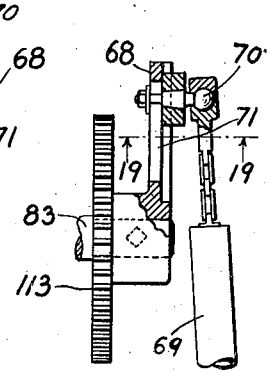
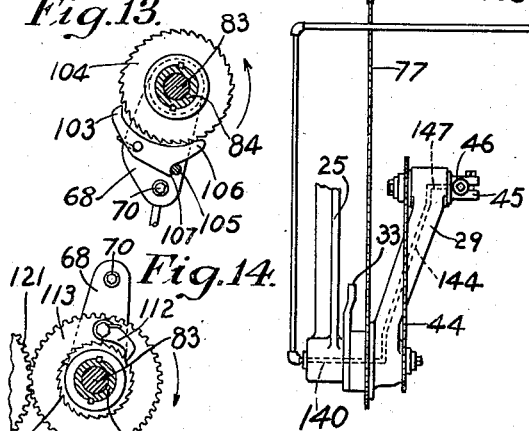
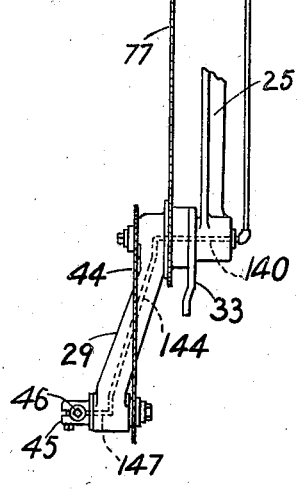
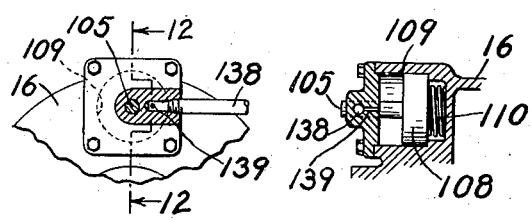
Inventor
E. H. Lorenz.
by Robt. D. Brown
Attorney.

Sept. 20, 1932.  E. H. LORENZ  1,878,156
APPARATUS FOR HANDLING GLASSWARE
Filed July 11, 1927   7 Sheets-Sheet 5
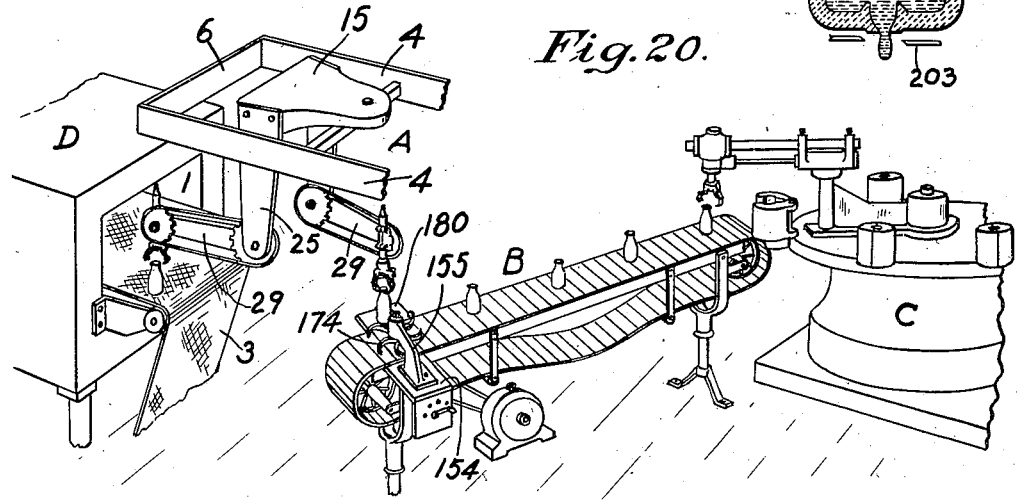
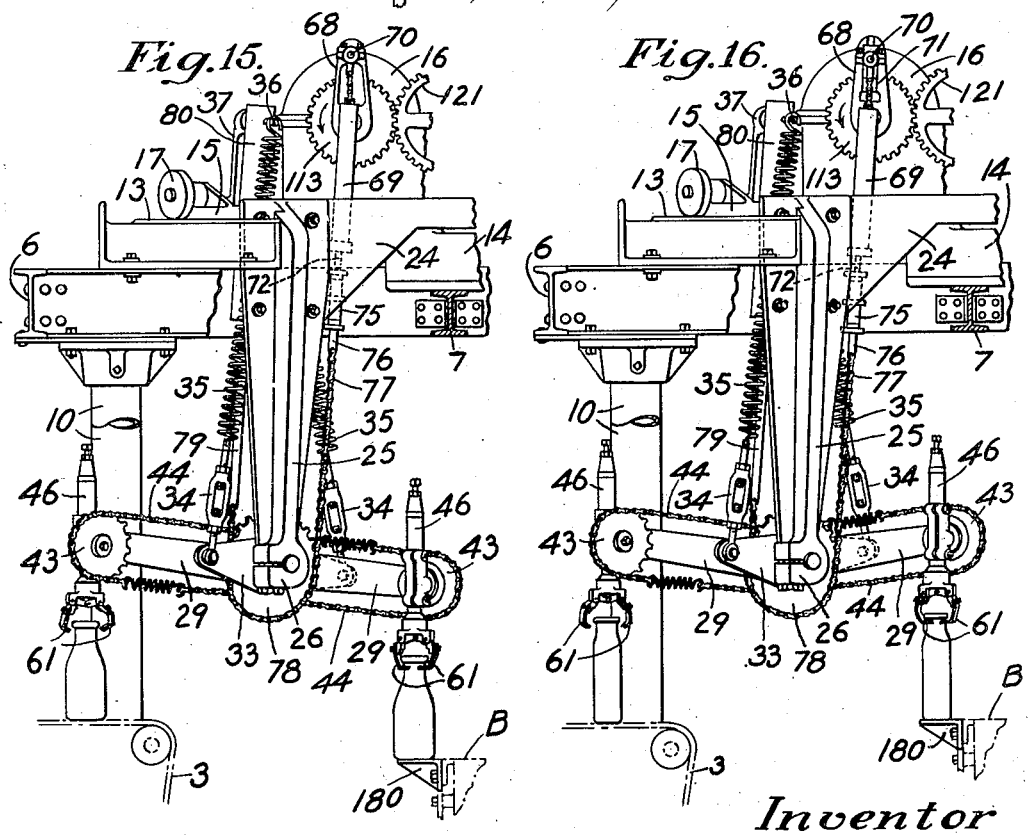
Inventor
E. H. Lorenz
by Robson & Brown
Attorney.

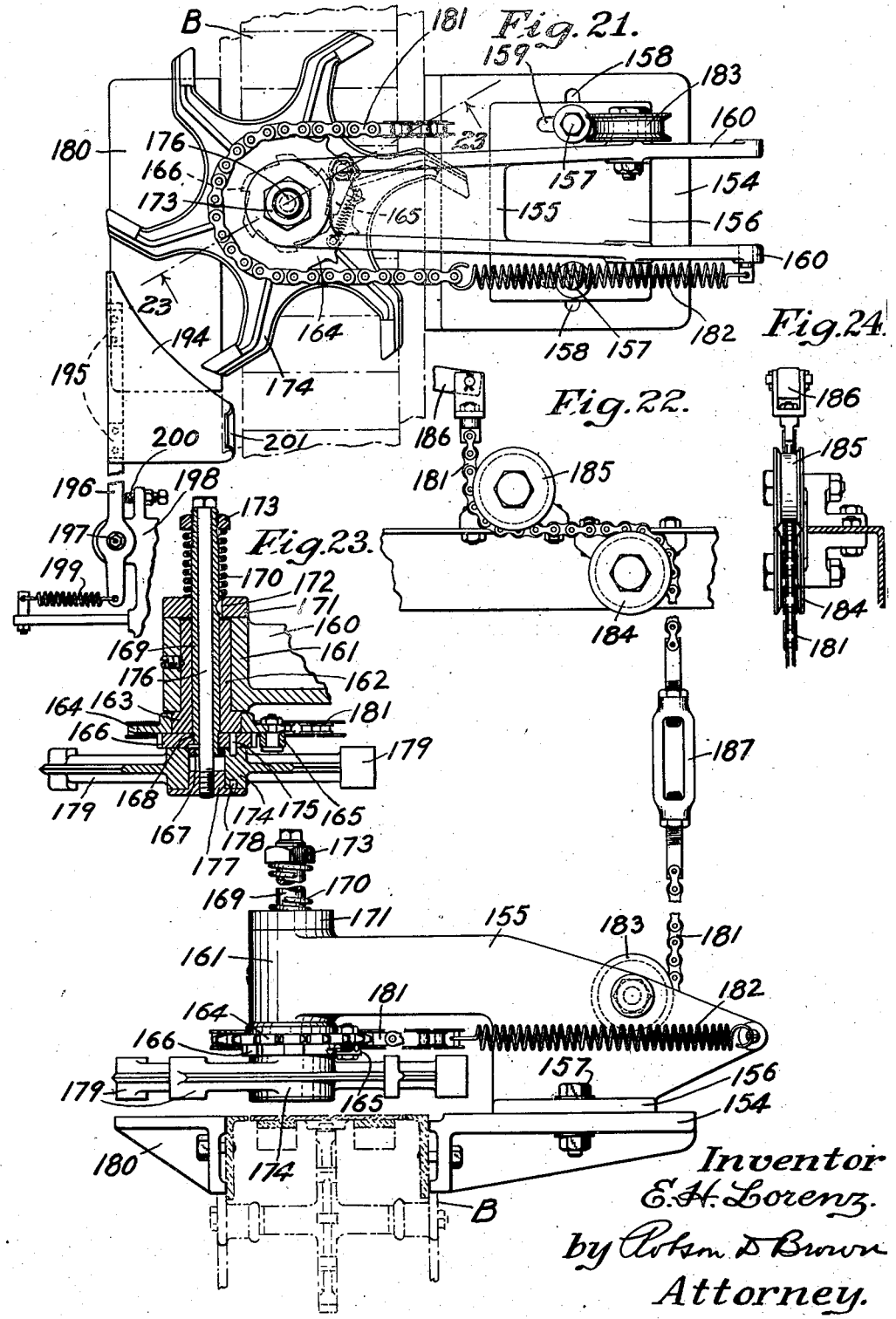

Sept. 20, 1932.  E. H. LORENZ  1,878,156
APPARATUS FOR HANDLING GLASSWARE
Filed July 11, 1927   7 Sheets-Sheet 7
Fig. 26.
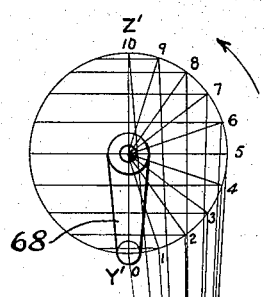
Fig. 27.
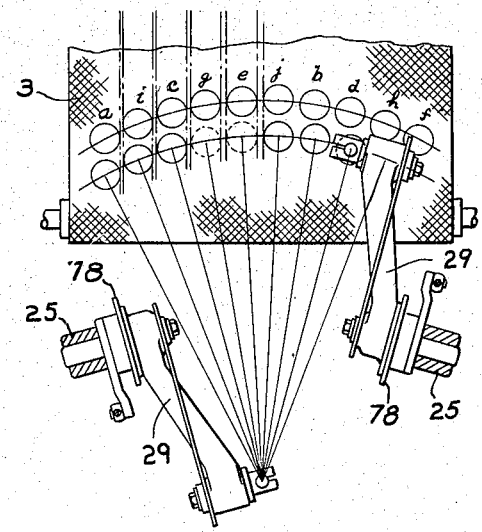
Fig. 28.
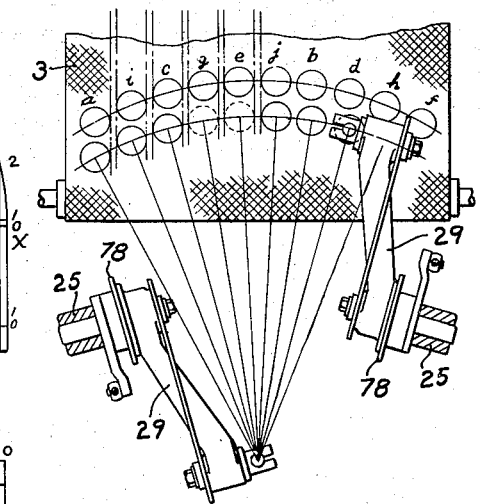
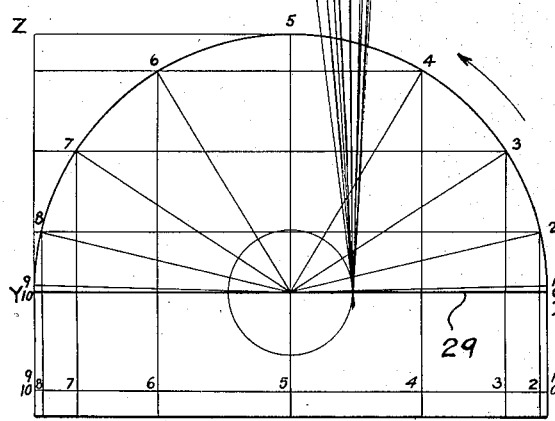
Fig. 25.
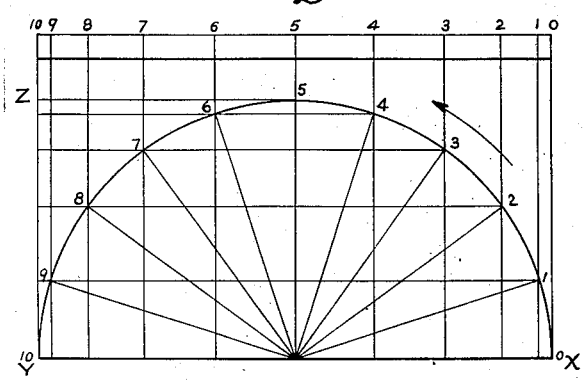
Inventor
E. H. Lorenz.
by Robert D Brown
Attorney.

Patented Sept. 20, 1932

1,878,156

UNITED STATES PATENT OFFICE

EDWARD H. LORENZ, OF WEST HARTFORD, CONNECTICUT, ASSIGNOR TO HARTFORD-EMPIRE COMPANY, OF HARTFORD, CONNECTICUT, A CORPORATION OF DELAWARE

APPARATUS FOR HANDLING GLASSWARE

Application filed July 11, 1927. Serial No. 204,875.

The invention relates to apparatus for handling glassware, and it has particular relation to devices for transferring successive glass articles from a receiving station, such as a buck, to a delivery station, such as a lehr conveyor, and distributing them laterally thereon in predetermined spaced relation with respect to each other.

One of the objects of the present invention is to provide an apparatus, of the character described, that will be uniform and accurate in operation and which will deposit the ware evenly on the conveyor without sliding engagement therewith or contact with each other, thereby not only reducing the loss through breakage to a minimum, but insuring a uniform thermal environment around the ware during the annealing stages.

Another object of the invention is to provide a device of the type described embodying a transfer arm mounted for oscillation about a horizontal axis at accelerating and decelerating angular and rectilinear speeds, thereby not only reducing the tendency to distort the relatively soft glass of the ware in both lateral and longitudinal directions, but insuring that the ware is accurately deposited on the conveyor in an upright position by reducing its tendency to swing at the time of its deposit which is particularly manifest in relatively tall ware of small cross section and which may result in the ware falling over, and also minimizing the tendency for ware having a relatively small neck finish to become disengaged from the transfer tongs of the device by sudden start or stoppage.

A still further object of the invention is to provide a device of the character described which is provided with means operating in timed relation therewith for successively placing articles in position to be engaged thereby at the receiving station.

A still further object of the invention is to provide a stacking device, the speed and period of operation of which is capable of being accurately timed with respect to the operation of the machine with which it is associated.

A still further object of the invention is to provide a device of the character described that is operated by one source of power, but which is controlled by another source of power, preferably the feeding device or the shaping machine, so that the ware will be transferred to the lehr conveyor in timed relation with the delivery of mold charges to the shaping machine or the fabrication of ware thereby.

Still another object of the invention is to provide a device of the character described which includes a transfer device mounted for movement between a receiving station and a delivery station and which is provided with transfer tongs mechanism for gripping and releasing the ware and having means for simultaneously applying power for both moving the transfer device and for operating the tongs, said means being so constructed and arranged that the beginning of the movement of the transfer device between the stations will be delayed relatively to the opening and closing of the tongs so as to insure that the ware is positively engaged and released thereby before the movement of the transfer device commences.

With such objects in view, as well as other advantages which may be incident to the use of the improvement, my invention consists in parts and combinations thereof hereinafter set forth in the following specification and claims.

In order to make the invention more clearly understood, there are shown in the accompanying drawings means for carrying the same into practical effect. The structure there shown is but one of many possible embodiments, and the application of my invention should not be understood as limited to the particular construction which, for the purpose of explanation, has been made the subject of illustration.

In the accompanying drawings:

Fig. 3 is an enlarged longitudinal sectional view through the stacking device;

Fig. 4 is a vertical transverse sectional view taken on the line 4—4 of Fig. 3;

Fig. 5 is a horizontal sectional view on a larger scale through one of the transfer arms and illustrating the passageway for conducting air under pressure to the tongs mechanism;

Fig. 7 is an enlarged vertical section of the tongs mechanism taken at right angles to Fig. 6;

Fig. 8 is a horizontal section taken on line 8—8 of Fig. 7;

Fig. 9 is a view partly in side elevation and partly in vertical section of the safety spring connection in the chain that oscillates the transfer arm;

Fig. 10 is a diagrammatic view illustrating the piping system for conveying air under pressure to the several parts of the mechanism that are operated pneumatically and timing of the control valve from the shear cam of a feeder;

Fig. 11 is a vertical section through one of the stop plunger cylinders;

Fig. 12 is a longitudinal sectional view taken on the line 12—12 of Fig. 11;

Fig. 13 is a vertical sectional view on a larger scale taken on line 13—13 of Fig. 2 and illustrating the ratchet and pawl connection between the constantly rotating driving means and the transfer arms;

Fig. 14 is a similar view taken on line 14—14 of Fig. 2 and illustrating the ratchet and pawl connection that prevents the device from over-running;

Fig. 15 is a fragmentary view of the transfer device illustrating an adjustment of the arms to operate between different levels;

Fig. 16 is a similar view illustrating the position of the arms when the parts are adjusted to shorten the arc of travel thereof;

Fig. 18 is a detailed view, with parts broken away, illustrating the adjustable connection between the transfer arm and the intermittently rotating crank which actuates the same;

Fig. 19 is a section taken on line 19—19 of Fig. 18;

Fig. 20 is a skeleton view in perspective, with parts removed, illustrating the general arrangement of the stacking device and spotting mechanism relative to the buck which delivers the bottles thereto from a shaping machine;

Fig. 21 is a plan view of the mechanism for transferring the articles of glassware from the buck to a position in alignment with the tongs of the stacking device;

Fig. 22 is a side elevational view of the structure shown in Fig. 21;

Fig. 23 is a vertical sectional view taken on line 23—23 of Fig. 21;

Fig. 24 is an end view of the rollers about which the chain passes that connects the spotting mechanism with the stacking device;

Fig. 25 is a chart illustrating the manner in which a varying horizontal component of the movement of the transfer arm is derived from a constant angular velocity;

Fig. 26 is a chart illustrating the manner in which an accelerating and decelerating horizontal component of movement of increased character is derived by imparting an accelerating and decelerating angular velocity to the transfer arms;

Figure 1:
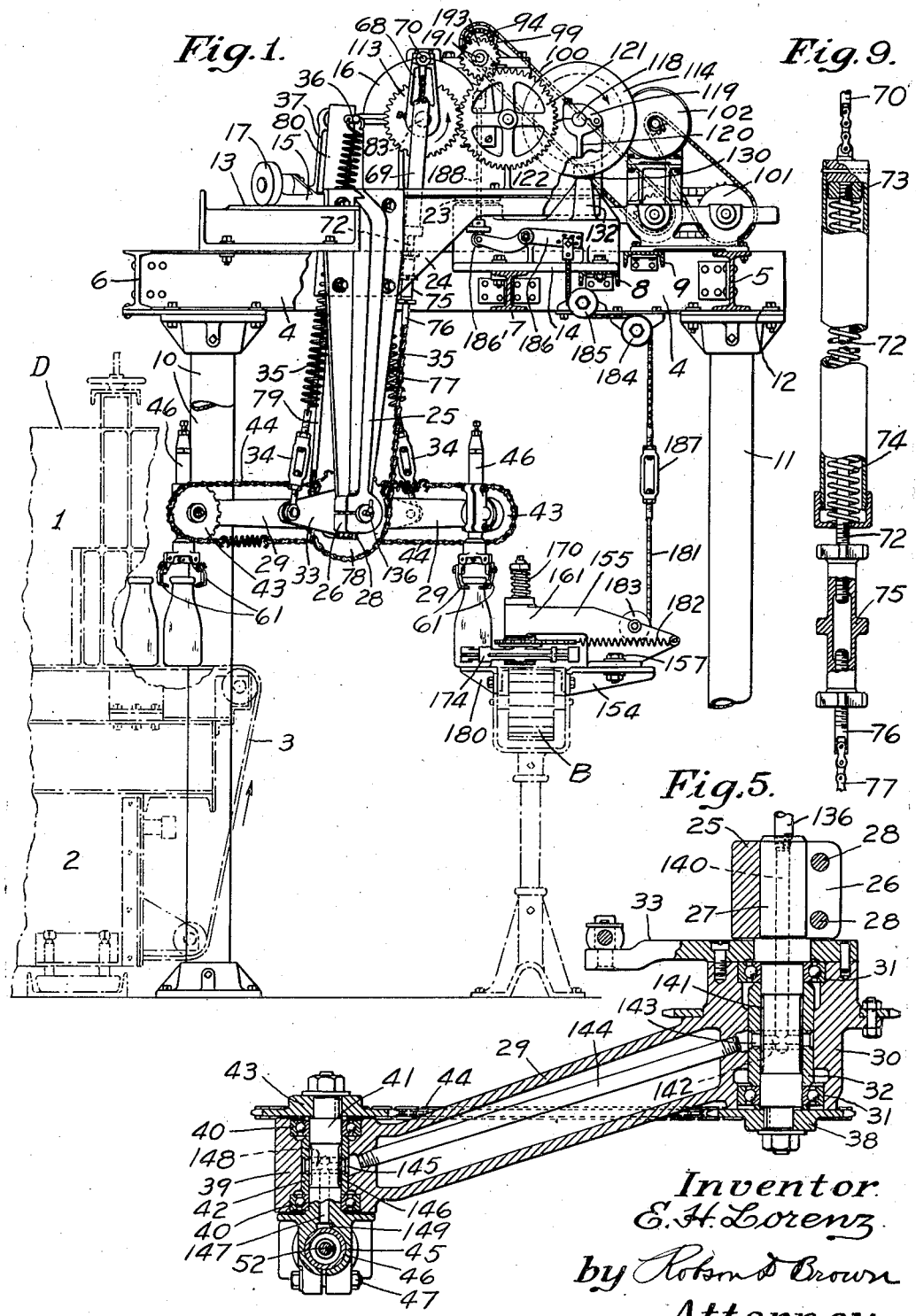
Figure 1 is a side elevation of a lehr loader or stacker constructed in accordance with the present invention and shown in connection with a lehr to which articles of glassware are transferred from a buck.

Fig. 27 is a chart illustrating the positions occupied by the bottles on the lehr conveyor if the transfer arms are oscillated horizontally through arcs of equal lengths; and Fig. 28 is a similar view illustrating the bottles positioned on the lehr conveyor in equally spaced longitudinal rows, which is rendered possible by intermittently moving the arms through selected arcs of varying size from the center of the conveyor toward the outer edges thereof.

The present invention is an improvement on that disclosed in my copending application for Letters Patent now patent No. 1,835,570, granted December 8, 1931 and is a continuation in part thereof.

Referring to the drawings, and particularly to Fig. 20, a lehr loader or stacker A, constructed according to the present invention, is illustrated as operating between a buck or conveyor B, which delivers articles of glassware thereto from a shaping machine C; and a tunnel lehr D, such as that disclosed in the patent to Vergil Mulholland No. 1,560,481. This lehr briefly comprises a tunnel 1, which is heated by a fire box 2 (Fig. 1) and through which articles of glassware are transported by a continuously moving endless conveyor 3 in order to prevent the formation of strains in the glass during its cooling stages.

The stacker A (Figs. 1, 2, 3 and 4) is mounted on an overhead frame structure adjacent to the receiving end of the lehr, and comprises longitudinally extending side channel members 4 connected by transversely extending I-beams 5 and 6 at the forward and rear ends thereof, and also by an intermediate transversely extending I-beam 7 and a pair of channel members 8 and 9. This structure is supported at its rear end by means of a pair of columns 10 disposed one on each side of the lehr, and at its forward end by a single column 11 (Fig. 1) which is secured at its upper end to a plate 12 which extends transversely beneath the channel members 4. By means of this arrangement, the column 11 may be shifted laterally according to the position of the shaping machine or machines, or that of the buck B.

An arcuate track 13 is mounted on the side channel members 4 adjacent to the rear of the frame, and a bearing bracket 14 is secured to the I-beam 7 and channel 8 at a point intermediate the side channels. The track 13 and the bearing bracket 14 together constitute the support for the stacking device proper which comprises a carriage 15 to which a mechanism box or housing, indicated as a whole at 16, is secured. The rear end of the carriage 15 is provided with a pair of rollers 17 which ride upon the track 13, and the housing 16 is formed with upper and lower hub portions 18 and 19 (Fig. 3). A pivot pin 20 is fixed in the lower hub 19 for pivotal engagement with a bearing 21 formed on the bracket 14. This pin is formed with an annular collar 22 which engages the under face of the housing 16 and which projects through an opening in the carriage 15 for supporting engagement with anti-friction bearings 23 interposed between the collar and the bearing 21. The bearings 23 consist of two rings having convex and concave engaging surfaces so as to provide a ball and socket joint to accommodate slight tilting movement of the carriage during the operation of the device. The carriage 15 and the parts carried thereby may thus be oscillated horizontally in a manner hereinafter to be described.

The carriage 15 is formed with depending flanges 24 on each side to each of which a transfer arm supporting bracket 25 is secured. The arms that transfer the ware from the buck B to the conveyor of the lehr are of identical construction, so that only the left hand arm (as determined while facing the lehr), shown particularly in Figs. 3 and 5, and the directly associated mechanism will be described. Each of the arms 25 is provided with a split bearing 26 (Fig. 5) at its lower extremity in which an inwardly projecting stud shaft 27 is clamped by means of bolts 28. An arm 29 of hollow construction is pivotally mounted on the shaft 27 and is formed at its inner end with a hub portion 30 for engagement with ball bearings 31. The raceways of the bearing 31 tightly engage the shaft 27 and are maintained in spaced relation by a sleeve 32 which is also fixed to the shaft. An arm 33 is secured to the hub 30 of the arm 29 adjacent to the bearing 26 and is connected at its outer end by a turn buckle 34 and spring 35 to a pin 36 projecting from a bracket 37 mounted on the carriage 15. This spring counterbalances the weight of the arm and may also tend to impart thereto an initial impetus at the beginning of its movement in each direction. A sprocket wheel 38 is fixed to the outer end of the stud shaft 27 (Fig. 5) and remains in a stationary position during the oscillation of the arm 29, as will presently be described.

Figure 6:
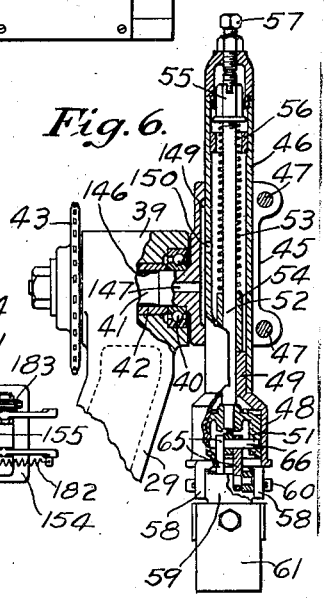
Fig. 6 is a view partly in elevation and partly in vertical section through the tongs mechanism.

The outer end of the arm 29 is also provided with a hub portion 39 for engagement with ball bearings 40, the inner raceways of which are fixed to a stud shaft 41 and which are maintained in spaced relation thereon by a sleeve 42 also fixed to the shaft 41. A sprocket wheel 43 is fixed to the outer end of the stud shaft 41 and is connected to the sprocket wheel 38 by means of a sprocket chain 44. By means of this arrangement, the tongs mechanism, which will now be described, is maintained vertical during the swinging movement of the transfer arm 29. The inner end of the stud shaft 41 is formed with a vertically extending split sleeve 45 through which extends a barrel 46 (Figs. 5, 6 and 7) which is clamped in the desired position by means of bolts 47 and which carries a fluid pressure cylinder 48 at its lower end. This cylinder is formed with a reduced portion 49 which is secured within the lower end of the barrel 46, and which is formed with an axial bore 50 extending vertically therethrough. A piston 51 is mounted for vertical reciprocation within the cylinder 48 and is provided with a piston rod 52 which extends loosely through the bore 50 and upwardly through the barrel 46. The piston 51 is urged upwardly by a coiled spring 53 which encircles the rod 52 and which is interposed between a sleeve 54 surrounding the lower end of the rod 52 adjacent to the reduced portion 49 of the cylinder 48 and an adjusting nut 55 which is threaded onto the upper end of the rod 52. This nut is adapted to engage an annulus 56 which is secured within the barrel 46 in order to adjustably limit the downward movement of the piston 51 when air pressure is applied within the cylinder 48, as will presently be described. The upward movement of the piston 51 is adjustably limited by means of a stop screw 57 which is threaded into the upper end of the barrel 46 and which is engaged by the upper end of the rod 52.

The lower edge of the cylinder 48 is provided with two diametrically disposed pairs of depending ears 58 between each pair of which a tongs holder 59 is pivotally mounted by means of a pivot pin 60. The tongs comprise a pair of gripping fingers 61, one of which is detachably secured to each of the holders 59 and each of which is formed with an inwardly projecting portion 62 provided with a notch 63 at its inner end for engagement beneath the neck finish of a bottle. The tongs holders 59 are also each provided with inwardly projecting arms 64 which are offset horizontally relative to each other (Fig. 8) and which are each pivotally connected to the lower end of one of a pair of links 65. The upper ends of the links 65 are pivotally connected to the piston 51 by means of a pin 66 and are maintained in spaced relation to each other by a spacing washer 67. By means of this construction, when air pressure is admitted to the cylinder 48, the piston 51 will be depressed, thus causing the gripping fingers 61 of the tongs to open, whereas when the air pressure within the cylinder is relieved, the spring 53 will elevate the piston 51 and close the tongs about the ware. It will thus be apparent that the ware is yieldably engaged by the tongs by a predetermined spring pressure. As has been pointed out before, the limit of the closing movement of the tongs may be accurately adjusted according to the diameter of the neck of the ware by means of the adjusting screw 57, and the opening limit may be adjusted by nut 55.

The arm 29 is swung in a counterclockwise direction (as seen in Figs. 1 and 3) from the buck B to the lehr D, in order to transfer an article from the former to the latter, by means of crank arm 68 which is pivotally connected to the upper end of a cylinder 69 by means of a ball and socket connection 70 and a short length of chain 70'. This connection may be adjusted radially in the slot 71, as shown in Figs. 16, 18 and 19, provided in the arm 68, in order to regulate the effective throw of the transfer arm 29. A rod 72 (Fig. 9) is disposed within the cylinder 69 and extends through the lower end thereof. The upper end of this rod is provided with a head 73, between which and the lower end of the cylinder is interposed a compression spring 74. The lower end of the rod 72 is threaded into a turn buckle 75 which is, in turn, threaded onto a rod 76. This rod is connected to one end of a sprocket chain 77, which passes around a sprocket wheel 78 carried by the hub 30 of the arm 29 and is connected at its other end to the lower extremity of a piston rod 79, which extends through a fluid pressure cylinder 80 and is provided at its upper end with a piston 81 (Fig. 3). The upper end of the cylinder 80 is pivotally connected to the pin 36, to which the upper end of the coil spring 35 is fastened. Fluid pressure is supplied to the lower portion of the cylinder 80 beneath the piston 81 through a pipe 82, which is connected to a source of constant pressure of, for example, 25 pounds.

At the conclusion of the transferring movement, the pressure in the cylinder 80 swings the arm 29 in a clockwise direction back to the buck to grasp another bottle. It will be noted that while the pressure in the cylinder 80 is sufficient to swing the transfer arm towards the buck, it is not sufficient to overcome the stronger action of the crank arm 68 in swinging it towards the lehr. During this latter movement, the air in the cylinder 80 is forced back into the system and functions as a spring in maintaining the chain 77 under tension, thus insuring a smooth and uniform movement. During the time that the transfer arm is swinging towards the buck under the action of the fluid pressure cylinder 80, the crank arm 68 is swinging downwardly at a constant angular velocity, thereby controlling the speed and character of movement of the piston 81 and the return movement of the transfer arm 29.

Figure 2:
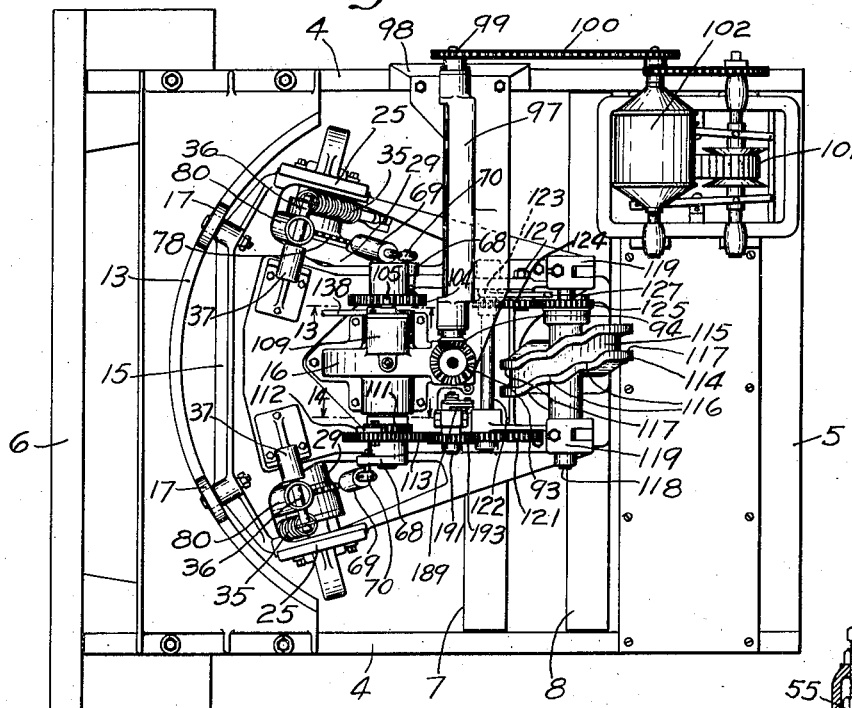
Fig. 2 is a plan view of the structure shown in Fig. 1.
Figure 17:
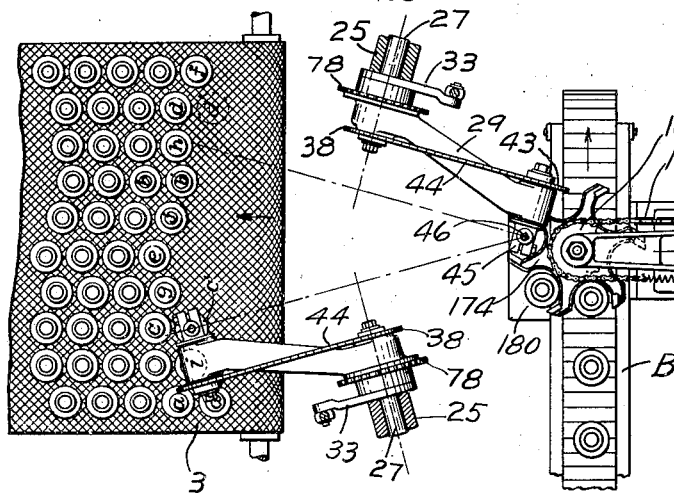
Fig. 17 is a horizontal sectional view through the stacking device and illustrating the positions of the articles deposited thereby upon the lehr conveyor and the order in which they are deposited thereon.

It will be apparent, from an inspection of Figs. 2 and 17 of the drawings, that the shafts 27, upon which the arms 29 are mounted, are angularly disposed relative to each other in such a manner that the surfaces generated by the vertical axes of the tongs as they swing toward and from the conveyor intersect on a prolongation of the axis of the swinging movement of the carriage 15. That is to say, an extension of the axis of oscillation of the carriage coincides with the intersection of said surfaces. By means of this construction, both of the tongs will grasp the ware at a common receiving point and release it at a plurality of delivery points. Also, the transfer arms 29 extend in substantially opposite directions relative to each other at their respective terminal positions, so that when the tongs carried by one arm are depositing a bottle on the lehr conveyor, the tongs carried by the other arm are grasping a bottle on the buck B.

Each transfer arm may be adjusted to operate between different levels, as shown in Fig. 15, by lengthening or shortening the turn-buckle 75, and also the arc of travel of the arm about its horizontal pivot may be lengthened or shortened, as shown in Fig. 16, by lengthening or shortening the effective length of the crank arm 68 through the medium of the adjustable pivotal connection 70 shown in Figs. 18 and 19.

The arms 68 are fixed to the opposite ends of a shaft 83 (Fig. 4) and are angularly displaced 180° with respect to each other. This shaft is mounted in a sleeve 84 which is journaled in bearings 85 on the housing 16 and is formed with a worm gear 86 which meshes with and is constantly rotated in a counterclockwise direction by a worm 87 which is fixed to a vertically extending shaft 88. The shaft 88 is journaled in roller bearings 89 mounted in the bearings 18 and 19 and extends upwardly through a cap 90 in axial alignment with the pivot pin 20 about which the carriage 15 swings. This cap is provided with a peripheral flange 91 which seats upon the upper surface of the bearing 18 and a cylindrical portion 92 extends into the bearing for engagement with the outer raceway of the upper roller bearing 89. The proper contact is thus maintained between the rollers and their associated raceways.

A bevel gear 93 is fixed to the upper extremity of the shaft 88 and is driven by a similar gear 94 which is fixed to the inner end of a horizontal drive shaft 95. This shaft is journaled in bearings 96 formed on the ends of a bracket 97 which is mounted at its inner end on the flange 91 of the cap 90, and at its outer end on a vertical bracket 98 carried by a side channel member 4. The shaft 95 is provided with a sprocket wheel 99 at its outer extremity which is driven by a chain belt 100 from a speed regulating device 101, such as a Reeves drive or the like, which is, in turn, driven from an electric motor 102.

The arms 68 are intermittently connected to and disconnected from the constantly rotating sleeve 84 by means of a spring actuated pawl 103 which is pivotally mounted on the left hand arm 68, as viewed in Fig. 4, and which is adapted to engage a ratchet wheel 104 which is keyed to the sleeve 84. This pawl is disengaged from the ratchet wheel twice during each rotation, so as to provide a dwell in the oscillation of the arms 29 when they each reach their extremes of movement, by means of upper and lower stop plungers 105, which are alternately projected into the path of movement of a cam portion 106 of the pawl 103 (Fig. 13) and which lift it out of engagement with the ratchet wheel 104. The pawl 103 is also formed with a shoulder 107 which successively engages the stop plungers 105 as soon as the pawl 103 has been moved to an inoperative position, and positively stops the movement of the arms 29 connected to the opposite ends of the shaft 83.

The plungers 105 are provided at their inner ends with pistons 108 which are, in turn, mounted for reciprocation in cylinders 109 provided in the housing 16. These pistons are urged outwardly by springs 110, but are alternately retracted by air pressure to a position without the path of travel of the pawl 103, to permit the same to engage the constantly rotating ratchet wheel 104 and be rotated thereby through an arc 180°, as will presently be described.

The momentum of the parts, unequal pressure in the cylinders 80, or unequal tension exerted by the counterbalance springs 35 may cause a tendency for the mechanism to overrun, and, therefore, to overcome this obvious disadvantage, a ratchet wheel 111 is fixed to the right hand end of the sleeve 84 as seen in Fig. 4 for engagement by a pawl 112 which is pivoted to a gear wheel 113 fixed to the hub of the right hand arm 68. The teeth of the ratchet wheel 111 are inclined in an opposite direction from those of the ratchet wheel 104, whereby the pawl 112 is in engagement with the ratchet wheel 111 throughout the movement of the transfer arms 29, and insures that they move at a regular speed and in unison with the rotation of the sleeve 84. As soon, however, as the pawl 103 is moved out of engagement with its associated ratchet wheel 104 by either of the stop plungers 105 at the conclusion of the active or return strokes of the transfer arms 29, the ratchet wheel 111 may continue to rotate away from the pawl 112, but the tendency of the arms 29 to overrun by the shaft 83 turning faster than the sleeve 84 is positively prevented.

The above construction insures that a bottle is moved vertically and horizontally at predetermined accelerating and decelerating velocities, thereby not only reducing the tendency to stretch the soft glass longitudinally, but also reducing the tendency to swing the bottle laterally at the beginning and conclusion of the transferring operation. This latter tendency is particularly undesirable in that not only may the neck of the bottle become distorted, but the bottle may be released by the tongs when it is in a position other than vertical, and as a consequence fall on its side upon the conveyor and displace other bottles in its vicinity.

The manner in which these accelerating and decelerating horizontal and vertical velocities of the transfer arm are obtained will be more apparent from an inspection of Figs. 25 and 26 of the drawings. With particular reference to Fig. 25, it will be noted that if the transfer arm 29 swings through its arc of 180 degrees at a constant angular velocity, both the horizontal component X—Y and the vertical component Y—Z thereof will be harmonic and inherently of an accelerating and decelerating character. The vertical component Y—Z, however, accelerates toward and decelerates away from the limits of the travel of the arm, which is highly undesirable. Now, with reference to Fig. 26, it will also be noted that inasmuch as the crank arm 68 swings vertically through an arc of 180 degrees at a constant angular velocity in swinging the arm 29 from the receiving station to the delivery station, the vertical component Y'—Z' thereof will be harmonic and also of an accelerating and decelerating character. As a consequence, the arm 68 will transmit a corresponding velocity to the angular movement of the transfer arm 29 through the medium of the chain 77 and the sprocket wheel 78 and, while slightly reducing the inherent accelerating and decelerating horizontal component movement X—Y of the arm 29 above referred to, will reverse the direction of acceleration and deceleration of the vertical component Y—Z of the movement of the arm 29 so that the tongs will pick up a bottle gradually and deposit it gradually on the lehr conveyor. This vertical deceleration in the movement of the arm 29 as it approaches the delivery station not only reduces the tendency to stretch the neck of the bottle longitudinally, but affords sufficient time for the bottle to discontinue any laterally swinging movement that may develop.

The carriage 15 and the mechanism mounted thereon is oscillated horizontally in order to distribute the ware transversely of the lehr conveyor, by means of a barrel cam 114 having a cam groove 115 provided in the periphery thereof. This groove is provided with a series of steps 116 for imparting a step-by-step movement to the carriage and with a pair of diametrically disposed dwells 117 for interrupting the lateral movement of the carriage while the transfer arms 29 are swinging over to deposit the last article of its row. This cam is fixed to a shaft 118 which is removably journaled in hinged split bearings 119 provided on upwardly extending brackets 120 formed on the carriage 15. The cam 114 is rotated intermittently so as to shift the carriage and the transfer arm carried thereby one step after each bottle is deposited on the conveyor by means of a gear 121 which meshes with the gear 113 and which is keyed at one end of a shaft 122 also journaled in the brackets 120. A pinion 123 is fixed to the other end of the shaft 122 and meshes with an intermediate gear 124 which, in turn, meshes with and drives a gear 125 which is fixed to the cam 114. The intermediate gear 124 as rotatably mounted upon a stud 126 (Fig. 3) carried by an arm 127 which is pivotally mounted upon the shaft 122. One end of the stud 126 extends through an arcuate slot 128 provided in the bracket 120 and may be adjustably secured in any position therein by means of a nut 129 (Fig. 2) threaded upon the outer end of the stud 126. By means of this particular construction, the mechanism, including the shaft 118, cam 114 and its associated gear 125, may be removed as a unit and replaced by a similar unit having a cam provided with a greater or less number of steps in its cam groove and having a larger or smaller gear fixed thereto in order to provide for a different spacing of bottles upon the lehr conveyor. In such a case, the intermediate gear 124 is shifted to a position in which it will accurately mesh with both the pinion 123 and with the different sized gear 125 on the substituted cam and the nut 129 tightened to maintain such adjustment.

The cam groove 115 engages a roller 130 which is mounted upon an upwardly extending stud 131 carried by bracket 132, which is formed integral with the casting 14. It will thus be apparent that as the cam 114 rotates, it will cause the carriage 15, upon which it is mounted, to oscillate horizontally by reason of the thrust imparted thereby upon the fixed roller 130. Thus a single cam controls the spacing of two devices; namely: the pair of transfer arms 29, and the general arrangement of the parts is such that practically any desired spacing of the bottles on the conveyor may be obtained. For example, the steps 116 of the cam 114 may be so proportioned and arranged that the bottles may be deposited in equally spaced longitudinal rows, as shown in Fig. 28, in contrast to the progressively increasing lateral spacing of the bottles from the outer edge of the conveyor toward the center thereof as would result from swinging the transfer arm equal angles, such spacing being shown in Fig. 27. Also by regulating the relative speeds of the continuously moving conveyor and the stacker, the ware may be deposited on a conveyor in staggered rows, thus rendering it possible to employ much greater surface area of the conveyor for the transportation of the ware through the lehr.

The air that operates the parts actuated by pneumatic pressure is derived from a common valve-controlled supply pipe 133 which leads to a source of constant pressure. This pipe communicates with a pipe 134 leading to a two-way valve 135 of any suitable type, which is constantly rotated by and in timed relation with a glass feeding device, preferably the shear mechanisms 203 thereof, or it may be operated by or with the shaping machine. Pipes 136 communicate with each side of the valve 135 and lead to a supporting cap 137 carried by the bracket 97. From this point the pipes 136 extend downwardly and each communicates with a pipe 138, which, in turn, communicates through a port 139 of reduced size (Figs. 11 and 12) in a cylinder 109 that operates a stop plunger 105 and also with an axial bore 140 (Fig. 5) provided in the shaft 27 upon which a transfer arm 29 is rotatably mounted. Each shaft 27 is formed with an annular reduced portion which forms, together with sleeve 32, a cylindrical passageway 141 which communicates with the bore 140 through ducts 142. This passageway also communicates through ducts 143 and an annular groove provided in the sleeve 32 with a pipe 144 which extends longitudinally through the hollow arm 29 and which, in turn, communicates through an annular groove and ducts 145 provided in the sleeve 42 with an annular passageway 146 formed by a reduced portion of the shaft 41. This shaft is also provided with an axial bore 147 which communicates at its inner end with the passageway 146 through ports 148, and at its outer end with a vertical slot 149 formed in the bearing 45. The slot 149 communicates, through a port 150 (Fig. 6), with the interior of the barrel 46 which, in turn, communicates with the interior of the tongs cylinder 48 through a passageway 151 provided in the rod 52 (Fig. 7).

It will be apparent, from the foregoing, that when the valve 135 is in position to supply air pressure to one of the stop cylinders 109 and to one of the tongs operating cylinders 48, it will permit the air pressure in the other stop cylinder and tongs cylinder to escape to the outer atmosphere.

By reason of the fact that the port 139, through which air is admitted to the stop cylinder 109 and escapes therefrom, is of reduced size, the action of the plunger 105 will be delayed with respect to the operation of the tongs piston 51. This is to insure that notwithstanding the fact that air pressure is admitted to and exhausted from each of these cylinders simultaneously, the tongs will open sufficiently to clear the neck of the bottle before the stop plunger 105 will be retracted to permit the transfer arm 29 to return to the receiving station, and conversely, to insure that the tongs securely grip the ware at the receiving station before the stop plunger 105 is withdrawn to permit the arm to swing to the discharge station.

The supply pipe 133 also communicates with a pipe 152 which is supported by the cap 137 and which extends downwardly and communicates through pipes 153 with the pipes 82 leading to the cylinders 80. This supply is normally never interrupted and, as hereinbefore stated, maintains a constant pressure within the cylinders 80.

It frequently occurs that the ware arrives at the transfer station in irregularly spaced relation on the buck, due to the fact that either the take-out does not deposit it accurately thereon, or that the bottles may slip on the buck while being transported thereby, or that the ware may be removed for inspection and then replaced inaccurately, or that the relative speeds of the buck and the stacker may vary by reason of the fact that they are driven by independent motors. These several factors render it necessary to provide means operating in timed relation with the stacking device for engaging such irregularly positioned ware and moving it to a position in accurate alignment with the tongs at the common receiving point. This, for example, may be accomplished by the following described mechanism:

A table 154 is secured to the frame-work of the buck and at one side thereof and carries a bracket 155. This bracket is provided with a base 156 which is secured to the table 154 for lateral and longitudinal adjustment relative to the buck by bolts 157 which project through transversely extending slots 158 and 159 provided in the table 154 and base 156 respectively. The bracket 155 is also provided with a pair of vertical flanges 160 which extend transversely over the buck in overhanging relation thereto and are provided at their outer ends with a bearing 161. A bushing 162 is fixed in the bearing 161 and is provided with an annular collar or shoulder 163 on the lower end thereof, which provides a bearing for a sprocket wheel 164. This sprocket wheel is provided with a pawl 165 for cooperation with a ratchet wheel 166 which is secured by means of a nut 167 against a shoulder 168 on the lower end of a sleeve 169 which extends vertically through the bushing 162. The upper end of the sleeve 169 extends above the upper end of the bearing 161 and is surrounded by a compression spring 170 which is interposed between a collar 171 which is keyed as at 172 to the sleeve adjacent to the bearing 161, and a nut 173 which is threaded onto the sleeve adjacent to its upper end. By tightening the nut 173, the spring 170 will be compressed, thereby increasing the friction between the upper face of the ratchet wheel 166 and the lower face of the collar 163, in order to prevent the ratchet wheel 166 from turning when the pawl 165 is rotated in the opposite direction for engagement with another notch.

An index wheel or spotter 174 is removably secured to the ratchet wheel 166 by means of a pin 175 and is supported in operative position by a bolt 176 which extends vertically through the sleeve 169 and is threaded into a flanged nut 177 at its lower end. This wheel is invertible so as to transfer ware to either side of the buck, as shown in Figs. 20 and 21. The nut 177 is pinned to the spotter wheel 174 at 178, thereby preventing it from rotating when the bolt 176 is turned.

The spotting wheel 174 is provided with a plurality of arms 179 which are shaped to conform to that of the particular type of ware being handled and are adapted to intercept the ware as it arrives on the buck and to intermittently transfer it to a shelf or table 180 located at one side of the buck and in a position to be gripped by the transfer tongs of the stacking device. The spotting wheel 174 may be removed in order to substitute therefor a wheel shaped to handle ware of a different type by unscrewing the bolt 176 until the nut 177 may be removed. The spotting wheel may then be lowered out of engagement with the pin 175 and removed from the machine without in any way displacing any of the other parts of the device or disturbing the proper frictional contact between the ratchet wheel 166 and the collar 163. In substituting a spotting wheel of different shape, the bolt 176 may be tightened without causing the ratchet wheel 166, which rotates with the spotting wheel, to bind against the lower face of the collar 163 for the reason that the ratchet wheel is clamped against the shoulder 168 on the sleeve 169. If a wheel having a different number of arms is used, a correspondingly different ratchet wheel will be used to correspond with it.

The spotter is intermittently rotated in the direction indicated in Fig. 21 in order to successively position articles of ware in line with the transfer tongs by means of a sprocket chain 181 which engages the sprocket wheel 164 and which is secured at one end to a spring 182, which is, in turn, secured to a flange 160 of the bracket 155. The other end of the sprocket chain 181 passes beneath a sheave or pulley 183 which is rotatably mounted on the other flange 160 of the bracket, and thence upwardly and over a sheave or pulley 184 which is mounted on the supporting frame of the stacking mechanism. From this point, the sprocket chain 181 passes beneath a sheave 185 and thence upwardly to a point where it is adjustably secured to one end of a lever 186 (Fig. 1), which is pivotally mounted upon the casting 14. A turnbuckle 187 is interposed in the chain 181 in order to adjust its length and the angular position of the spotting wheel. The other end of the lever 186 is provided with a roller 186' which is adapted to be engaged by the lower end of a vertically reciprocating plunger rod 188, the upper end of which is pivotally connected to a crank arm 189 by means of a link 190. This arm is fixed to one end of a shaft 191, which is journaled in a bracket 192 mounted upon the carriage 15 of the stacking mechanism. A gear 193 is fixed to the other end of the shaft 191 and meshes with the gear 121 which drives the carriage index cam 114.

The ratio between the gear 113 and the gear 193 is such that one-half of a rotation of the former will cause a complete rotation of the latter through the gear 121 in order to index the spotting wheel 174 one space and move an article into a position to be gripped by the tongs upon each oscillation of the transfer arms 29.

The spotting wheel 174 remains at rest and in engagement with the ware until the latter is removed by the transfer device, thereby steadying the ware while being grasped by the tongs. Also, the spotting wheel functions to remove defective ware by reason of the fact that if the ware is imperfectly formed it cannot be grasped by the tongs and will consequently be moved out of alignment therewith upon the next succeeding movement of the spotting wheel.

The ware is prevented from becoming displaced from the table 180 during the time that it is being aligned by the spotting wheel 174 by a guide 194 which is hinged for vertical swinging movement, as at 195 on an arm 196. This arm is pivotally mounted, as at 197 on a bracket 198 carried by the frame of the buck, and is yieldably maintained in operative position by means of a coiled spring 199. The position of the guide relative to the spotting wheel may be regulated by an adjustable stop 200. The guide is formed with an upwardly curved edge 201 so that if ware should arrive at the receiving station lying upon its side, it will be carried beneath the guide 194, thereby swinging the same upwardly and permitting the ware to fall from the table without in any way interfering with the operation of the spotting device.

In operation, let it be assumed that the two-way valve 135, which is rotated continuously by the glass feeding device, moves to a position in which it establishes communication between the source of air under pressure in the pipe 133 and both the pipe 136, which leads to the upper stop cylinder 109, and the tongs cylinder 48 (Fig. 6) of the left-hand transfer arm 29, as viewed in Fig. 10. When in such position, the valve 135 also establishes communication between the outer atmosphere and both the lower stop cylinder 109 and the tongs cylinder 48 of the right-hand transfer arm. With particular reference to Figs. 1 and 3 of the drawings, in which the left-hand transfer arm 29 is shown as occupying a position adjacent to the lehr conveyor, it will be seen that the admission of air to the cylinders 48 and 109 will cause the tongs 61 to open against the action of the spring 53, and the stop plunger 105 to retract against the action of the spring 110. The retraction of the plunger 105 will permit the pawl 103 to move into engagement with the constantly rotating ratchet wheel 104, and at the same time release the arm upon which the pawl 103 is mounted. This will permit the constant pressure in the cylinder 80 to elevate the piston 81 and to swing the transfer arm 29 and the tongs mechanism carried thereby in a clockwise direction under the control of the arm 68 toward the receiving station adjacent to the buck B.

Simultaneously with the above described movements, the release of air from the tongs cylinder 48 of the right hand transfer arm 29 and the lower stop cylinder 109 will permit the spring 53 to close the tongs 61 and the spring 110 to project the lower stop plunger 105 into the path of movement of the pawl 103. Inasmuch as the pawl 103 and the arm 68 upon which it is mounted are rotated downwardly, having been released by the upper stop plunger 109, the arm 68 at the other end of the shaft 83 which is angularly displaced 180° with respect thereto, is rotating upwardly, thereby swinging the right hand transfer arm toward the lehr conveyor against the constant pressure in its associated cylinder 80. This movement continues until the pawl 103 engages the lower stop plunger 105 and is disengaged thereby from the ratchet wheel 104 and its movement temporarily arrested.

The continued rotation of the valve 135 (Fig. 10) next establishes communication between the pipe 136 which leads to the left hand tongs cylinder 48 and the upper stop cylinder 109 on the one hand and the outer atmosphere on the other, thus permitting the pressure in these cylinders to be relieved. At the same time, the valve 135 establishes communication between the source of pressure and the pipe 136 leading to the tongs cylinder 48 of the right hand transfer arm and the lower stop plunger 109. The relief of pressure in the tongs cylinder 48 and the left hand transfer arm, which now occupies a position at the receiving station, permits the tongs 61 to close under the action of the spring 53 and to grasp a bottle that has been positioned in alignment therewith by the spotting wheel 174. Simultaneously with the closing of the tongs to grasp a bottle, the application of pressure to the lower stop cylinder 109 retracts the stop plunger 105 and permits the pawl 103 to again engage the constantly rotating ratchet wheel 104 which causes the arm 68 upon which the pawl 103 is mounted to swing the tongs mechanism carrying a bottle in a counterclockwise direction toward the lehr conveyor, through the medium of the sprocket chain 77 and sprocket wheel 78, and against the cushioning action of the constant pressure in the cylinder 80 that initially swung the transfer arm toward the buck, the air in this cylinder being forced back into the system. This movement will continue until the pawl 103 again engages the upper stop plunger 105 and is moved thereby out of contact with the ratchet wheel 104. This will again arrest the movement of the transfer arm 29 in a position over the lehr conveyor where the tongs will release the bottle in the manner previously described, and the cycle of movement is repeated.

During the oscillatory movement of the arm 68, the gear 113 which is keyed to the right-hand arm 68, as viewed in Fig. 4, will transmit intermittent rotative movement to the cam 114 through the intermediate gearing in order to oscillate the carriage 105 horizontally so as to distribute a series of articles transversely across the lehr conveyor, each arm traversing one-half thereof.

Referring particularly to Figs. 2 and 17, it will be noted that the cam 114 is so shaped that when the lower arm 29, as viewed in Fig. 17, is depositing the first bottle of a transverse row, indicated at *a*, the dwell 117 formed therein is in engagement with the fixed roller 130, thereby maintaining the carriage 15 and the parts mounted thereon stationary. During the time that the lower arm is returning to the receiving position and the upper arm is conveying an article towards the conveyor, the dwell 117 leaves the roller 130 which is next engaged by the first of the steps 116 so as to swing the carriage laterally one space so that the second bottle will be deposited in the position indicated at *b*. As soon as the bottle *b* has been deposited, the upper arm returns to receiving position and simultaneously therewith the lower arm swings over during the horizontal movement imparted to the carriage 15 by the second step 116 of the cam 114, and deposits the third bottle on the lehr conveyor in the position indicated at *c*. The lower arm then returns to the receiving position and the upper arm is swung toward the lehr conveyor simultaneously with the succeeding lateral movement of the carriage, and deposits the fourth bottle thereon in the position indicated at *d*. At the conclusion of this movement, the upper arm returns to the receiving position to grasp another article, and simultaneously therewith the lower arm swings toward the lehr conveyor during another lateral movement of the carriage and deposits the fifth bottle thereon in the position indicated at *e*. Following this movement of the lower arm, the second dwell 117 in the cam 114 engages the roller 130 and maintains the carriage stationary while the lower arm is returning to the receiving position and the upper arm bearing an article of glassware is swinging towards the conveyor to deposit the sixth bottle thereon in a position indicated at *f*. At the conclusion of this movement, the second dwell 117 leaves the cam 114 and the carriage is moved one step in the opposite direction, so that the lower arm will deposit the seventh bottle on the conveyor in the position indicated at *g*. The upper arm then swings toward the conveyor during the time that cam 114 is moving the carriage one space and deposits the eighth bottle on the conveyor in the position indicated at *h*. The lower arm then swings toward the conveyor during the time that the carriage is moving one space and deposits the ninth bottle on the conveyor in the position indicated at *i*, as shown in Fig. 17 of the drawings. The upper arm is then moved towards the conveyor and deposits the tenth bottle thereon during the time that the carriage is being moved one step in the position indicated at *j*. At this time, the first dwell 117 in the cam 114 again engages the roller 130 so as to impart no further horizontal movement to the carriage during the time that the upper arm is returning to the receiving station and the lower arm is swinging toward the conveyor to deposit thereon the initial bottle of the next succeeding row in which corresponding positions are indicated by similar letters with a prime mark. It will be understood that the longitudinal spacing of the ware as indicated in the drawings is due to the fact that the conveyor is continuously moving throughout the time that ware is being transferred thereto.

It will thus be apparent that each arm alternately grasps a bottle at a common receiving point and delivers it to a plurality of delivery points and that, by reason of the fact that each arm, as far as its own half of the conveyor is concerned, deposits alternate bottles in traversing the conveyor in one direction and fills in the spaces between these bottles during its movement in the opposite direction, it is never necessary to move the carriage more than one space. This has the advantage of avoiding relatively large and violent lateral movements of the carriage and renders it possible to employ an index cam of practical design.

The length of dwell of the transfer arms 29 at each end of their strokes may be lengthened or shortened as desired by increasing or decreasing the speed of the Reeves drive and without in any way affecting the total time of the transferring operation which is controlled by the glass feeding device through the medium of the timing valve 135. That is to say, by increasing the speed of the Reeves drive, the speed of the transfer arms is increased, thereby allowing more time at the receiving and delivering stations, and conversely, by decreasing the speed of the Reeves drive, the speed of transfer will be decreased and as a consequence, shortening the period of dwell of the transfer arms at each end of their arcs of travel. Thus both the speed and the length of dwell of the arms may be proportioned according to the particular type of ware being handled.

The term "glassworking machines", as employed in the appended claims, is intended to cover either a glass shaping machine or a glass feeding device, as either of these instrumentalities may be employed within the purview of the invention. It is preferable, however, to operate the stacker from the feeding device, as herein shown and described, for the reason that if the operation of the shaping machine should be temporarily discontinued, the stacking device will continue to remove the articles of glassware advancing on the buck. I, however, do not wish to limit the invention in this respect, for the reason that the present stacking device is capable of being employed as a take-out to remove articles directly from the molds of the shaping machine and to deposit them upon the lehr conveyor without the use of an intermediate transferring agency. In such case, it is preferable to operate the stacking device directly from the shaping machine.

It will be understood that the several necessary elements constituting the invention may be varied in proportion, arrangement and mode of operation without departing from the nature and scope of the invention as set forth in the appended claims.

I claim:

1. Apparatus for handling glassware comprising a transfer arm, continuously operating driving mechanism for swinging said transfer arm between a ware-receiving station and a ware-delivery station to transfer articles of glassware from the former to the latter, and a clutch mechanism for temporarily rendering said driving mechanism inoperative and to interrupt the movement of said arm at each of said stations.

2. Apparatus for handling glassware comprising a transfer arm mounted for swinging movement between a ware-receiving station and a ware-delivery station, continuously acting means for swinging said arm, and additional means for temporarily rendering said continuously acting means ineffective and to interrupt the movement of said arm at each of said stations.

3. Apparatus for handling glassware comprising a transfer arm, continuously operating driving mechanism for swinging said transfer arm about a horizontal axis between a ware-receiving station and a ware-delivery station to transfer articles of glassware from the former to the latter, and a clutch mechanism for temporarily rendering said driving mechanism inoperative and to interrupt the movement of said arm at each of said stations.

4. A lehr loader or stacker, in combination with glass forming machinery and a lehr, comprising a transfer arm mounted for swinging movement about a horizontal axis, continuously operating driving mechanism for swinging said arm between a ware-receiving station and a ware-delivery station to transfer articles of glassware from the former to the latter, clutch mechanism for connecting and disconnecting said transfer arm with said driving mechanism, and means for automatically actuating said clutch mechanism in timed relation to the movement of the associated glassworking machinery.

5. Apparatus for handling glassware comprising a pair of transfer arms, means for alternately moving said arms between a ware-receiving station and a lehr conveyor, means for moving each of said arms transversely across one-half the width of said conveyor with dwells long enough for each arm to deposit an article thereon only at the ends of said transverse movement, and means for arresting transverse movement of said arms at each end of their paths of travel in each direction to permit each arm to deposit an article upon said conveyor at the limits of their transverse movement.

6. Apparatus for handling glassware comprising a pair of transfer arms, means for moving said arms alternately between a ware-receiving station and a ware-delivery station, means for intermittently moving said arms transversely of said delivery station to distribute articles transversely thereof one step for each article deposited thereon intermediate the limits of said transverse movement, and means for interrupting the transverse movement of said arms at the limits of their movement in each direction to permit each arm to deposit an article at the limits of such movement.

7. In combination with a glass working apparatus, a device for transferring articles of glassware fabricated by said apparatus from a ware-receiving station to a ware-delivery station, timing means operated by said apparatus for synchronizing the operation of said device with that of said machine, and means independent of said apparatus for driving said device at a variable speed, whereby to control the dwell interval at the delivery station to permit the proper setting up of ware delivered at said delivery station.

8. In combination with a glass working apparatus, a device for transferring articles of glassware fabricated by said apparatus from a ware-receiving station to a ware-delivery station, comprising a pair of transfer members movable back and forth between said stations, timing means operated by said apparatus for synchronizing the operation of said transfer members with that of said apparatus and independent means for simultaneously moving both said transfer members in opposite directions back and forth between said stations at a variable speed, whereby to control the dwell intervals of said transfer members at each of said stations.

9. Apparatus for handling glassware comprising a transfer device, means for moving said device to transfer glassware from one position to another, said moving means operating at a constant speed, and means for operating said transfer device from said moving means so arranged that the transfer device has an angular acceleration over the first portion of the path of movement and an angular deceleration over the remainder of said path.

10. Apparatus for handling glassware comprising a transfer device movable in a substantial vertical plane through an arc of substantially 180° to transfer ware from a receiving station to a plurality of delivery stations, means for moving said device in said plane with a substantially harmonic angular velocity, and means for changing the position of said plane to distribute the ware being transferred to a plurality of laterally spaced delivery stations.

11. A lehr loader or stacker, in combination with glass forming machinery and a lehr, comprising a transfer arm mounted for swinging movement about a horizontal axis, continuously operating driving mechanism for swinging said arm between a ware-receiving station and a ware-delivery station to transfer articles of glassware from the former to the latter, clutch mechanism interposed between said arm and said driving mechanism, means to disengage said clutch, as said arm moves to one of said stations, means acting positively to stop said arm at the last named station, and means timed with the operation of said glass forming machinery to reengage said clutch to permit said arm to move toward the other of said stations.

12. The combination with a lehr for annealing glassware having a continuously moving conveyor belt for transporting the ware therethrough, of a stacking device, comprising a carriage, transfer mechanism mounted on said carriage for oscillatory movement to convey articles of glassware successively from a receiving station and place them on the conveyor belt of the lehr, means for oscillating the transfer mechanism, means for causing said mechanism to engage the articles at the receiving station and release them at the desired position on the lehr conveyor belt, and means for intermittently moving the carriage laterally through predetermined angular distances such that the articles are stacked in a plurality of longitudinal rows on the lehr conveyor belt and such that successively stacked articles are stacked in said rows separated by at least one intermediate row, whereby articles stacked in contiguous longitudinal rows are so stacked after material time intervals during which the continuous movement of the lehr conveyor will cause articles of contiguous longitudinal rows to be staggered in a direction longitudinally of the lehr belt, and whereby the longitudinal rows on said belt may overlap contiguous rows in a transverse direction.

13. Apparatus for handling glassware comprising a pair of transfer arms mounted for movement about horizontal axes, means for swinging said arms alternately, each between a ware-receiving station and one of a plurality of ware-delivery positions on a lehr conveyor, a cam for swinging said arms in unison to distribute the articles transversely of said conveyor, said cam having a configuration such that the swinging movement given the arms between the successive placing of any two articles does not exceed that corresponding to the transverse spacing of contiguous longitudinal rows of articles on said conveyor.

14. Apparatus for handling glassware comprising a pair of transfer arms mounted for movement about horizontal axes, means for swinging said arms alternately between a common ware-receiving station and one of a plurality of ware-delivery positions on a lehr conveyor, and a cam for swinging said arms in a transverse direction to distribute the articles transversely of said conveyor, said cam having a configuration such that the swinging movement given the arms between the successive placing of any two articles does not exceed that corresponding to the transverse spacing of continguous longitudinal rows of articles on said conveyor.

15. Apparatus for handling glassware comprising a transfer device mounted for oscillatory movement between a ware-receiving station and a ware-delivery station, continuously acting means for oscillating said device between said stations, means for temporarily rendering said continuously acting means ineffective, and additional means to prevent said device from overrunning the action of said continuously acting means.

16. Apparatus for handling glassware comprising a transfer device mounted for oscillatory movement between a ware-receiving station and a ware-delivery station, continuously acting means for oscillating said device between said stations, means for temporarily rendering said continuously acting means ineffective, and positively to interrupt the movement of said device at each of said stations, and additional means to prevent said device from overrunning the action of said continuously acting means.

17. Apparatus for handling glassware comprising a transfer arm, continuously operating driving mechanism for swinging said arm about a horizontal axis between a ware-receiving station and a ware-delivery station to transfer glass articles from the former to the latter, a clutch mechanism for temporarily rendering said driving mechanism inoperative and positively to interrupt the movement of said arm at each of said stations and a ratchet mechanism to prevent said arm from overrunning the action of said driving mechanism.

18. The combination with a glassware transferring device which is adapted to pick up articles of glassware at a predetermined ware-receiving station and transfer it to a ware-delivery station, of an endless conveyor positioned to convey a series of glass articles toward said ware-receiving station, and a positioning device associated with said conveyor comprising a member having an arm thereon and mounted for rotation about a vertical axis, means for rotating said member intermittently in timed relation to the operation of said transferring device, whereby said arm may engage a piece of glassware on said conveyor and move it to a predetermined position at said ware-receiving station, said positioning device being so constructed and arranged that any article not removed from said ware-receiving station by said transferring device will be automatically moved out of the path of the oncoming articles by continued movement of said arm, whereby to prevent jamming of the transfer system.

19. Apparatus for handling glassware comprising a transfer arm movable about a substantially horizontal axis to transfer articles of glassware from a ware-receiving station to a ware-delivery station, means to swing said arm between said stations, and adjustable means to counterbalance the weight of said arm, whereby to minimize the force necessary to effect the swinging movement thereof.

20. Apparatus for handling glassware comprising a transfer arm movable about a substantially horizontal axis to transfer articles of glassware from a ware-receiving station to a ware-delivery station, means to swing said arm between said stations, and a spring for counterbalancing the weight of said arm, said spring being connected to exert an increasing counterbalancing force as said arm moves toward a horizontal position in either direction.

21. Apparatus for handling glassware comprising a transfer arm movable about a substantially horizontal axis to transfer articles of glassware from a ware-receiving station to a ware-delivery station, means to swing said arm between said stations, a spring for counterbalancing the weight of said arm, said spring being connected to exert an increasing counterbalancing force as said arm moves toward a horizontal position in either direction, and means for varying the force exerted by said spring at a given position of said arm.

22. Apparatus for handling glassware, comprising a transfer arm, means for swinging said arm about a horizontal axis between a ware-receiving station and a ware-delivery station to transfer articles of glassware from the former to the latter, and means for varying the distance of angular travel of said arm about said axis.

23. Apparatus for handling glassware, comprising a transfer arm, means for swinging said arm about a horizontal axis between a ware-receiving station and a ware-delivery station to transfer articles of glassware from the former to the latter, tongs mechanism carried by said arm, means for varying the distance of angular travel of said arm about said axis, and means for adjusting said tongs mechanism relative to said arm to handle ware of different heights.

24. Apparatus for handling glassware, comprising a transfer arm, means for swinging said arm about a horizontal axis between a ware-receiving station and a ware-delivery station to transfer articles of glassware from the former to the latter, means for varying the distance of angular travel of said arm, about said axis, and additional means for shifting the path of travel of said arm angularly about said axis to operate between stations at different levels.

25. Apparatus for handling glassware, comprising a transfer arm, means for swinging said arm about a horizontal axis between a ware-receiving station and a ware-delivery station to transfer articles of glassware from the former to the latter, tongs mechanism carried by said arm, means for varying the distance of angular travel of said arm about said axis, additional means for shifting the path of travel of said arm angularly about said axis, and means for adjusting said tongs mechanism relative to said arm, whereby to enable the transfer apparatus to operate between stations at different levels and to be used in connection with ware of different heights.

26. Apparatus for handling glassware comprising a transfer device mounted for movement between a ware-receiving station and a ware-delivery station, and means for accelerating and decelerating the movement of said device in vertical and horizontal directions at the beginning and conclusion of its travel from said receiving station to said delivery station.

27. Apparatus for handling glassware comprising a transfer device, means for moving said device to transfer glassware from one position to another, said moving means operating at a constant speed, and means for operating said transfer device from said moving means so arranged that the transfer device has an angular acceleration over the first portion of the path of movement and an angular deceleration over the remainder of said path.

28. Apparatus for handling glassware comprising a transfer arm, means for moving said arm between a ware-receiving station and a ware-delivery station, and means for swinging said arm about a vertical axis varying angular distances to deposit said articles at said delivery station in predetermined spaced relation transversely thereof.

29. Apparatus for handling glassware comprising a transfer arm, means for moving said arm between a ware-receiving station and a conveyor located at a ware delivery station, and means for intermittently moving said arm through arcs of varying magnitude from the edge of said conveyor toward the center thereof.

30. Apparatus for handling glassware comprising a transfer device, tongs mechanism carried by said device, means for moving said device between a ware-receiving station and a ware-delivery station, means for opening and closing said tongs, means simultaneously applied for rendering active said moving means and said tongs opening means, and means for delaying the effective action of said moving means relative to the action of said tongs opening means.

31. Apparatus for handling glassware, comprising a carriage mounted for swinging movement about a vertical axis, a plurality of transfer arms mounted on said carriage for swinging movement about horizontal axes, means supported by the carriage and actuated through the axis of swinging movement thereof for both swinging said carriage and said transfer arms about said vertical axis and said transfer arm alternately about said horizontal axis between the ware-receiving station and a plurality of ware delivery stations.

32. Apparatus for handling glassware, comprising a transfer arm mounted for swinging movement about a horizontal axis between a ware receiving station and a ware delivery station, mechanical means for swinging said arm from one of said stations to the other, and fluid pressure means for returning said arm to the station from which it was swung.

Signed at Hartford, Conn., this 29th day of June, 1927.

EDWARD H. LORENZ.